United States Patent [19]

Etkin

[11] 3,822,582
[45] July 9, 1974

[54] DEVICE FOR MEASURING THE CONCENTRATION OF SUSPENDED PARTICLES

[76] Inventor: Vulf Borisovich Etkin, Vostochnaya ulitsa, 1/7, korp. 1, kv. 60, Moscow, U.S.S.R.

[22] Filed: Oct. 4, 1972

[21] Appl. No.: 294,876

[52] U.S. Cl. .................................... 73/28, 73/61 R
[51] Int. Cl. .......................................... G01n 15/06
[58] Field of Search...... 73/61 R, 28, 205 D, 194 M

[56] References Cited
UNITED STATES PATENTS
3,127,770   4/1964   Allard et al................... 73/205 D X

*Primary Examiner*—Richard C. Queisser
*Assistant Examiner*—Joseph W. Roskos
*Attorney, Agent, or Firm*—Holman & Stern

[57] ABSTRACT

A device for measuring the concentration of suspended particles in which there is provided a pipeline wherein the suspended particles are transported pneumatically, with the pipeline being equipped with an element for introduction of these particles. An additional pipeline is located relatively to the principal pipeline so that one of its ends, being the outlet end with respect to the direction of flow of the carrier fluid, is disposed in the region of velocity stabilization of the suspended particles on the measuring portion confined by this region and the element for introduction of particles, and the other end is located outside the said measuring portion in the region free of particles transported in suspension. The principal pipeline contains a parametric converter of the parameter characterizing the mass flow rate of carrier fluid, and the additional pipeline in which only the carrier fluid flows contains a parametric converter, characterizing the mass flow rate of suspended particles, with the magnitude of the signals from the parametric converters being used to determine the concentration of the suspended particles.

3 Claims, 3 Drawing Figures

DEVICE FOR MEASURING THE CONCENTRATION OF SUSPENDED PARTICLES

BACKGROUND OF THE INVENTION

The present invention relates to measuring instruments, and more particularly, to devices for measuring the concentration of suspended particles designed mainly to be used in the installations in which it is necessary to maintain an assigned concentration of suspended particles.

The invention can be employed, for example, in power engineering to maintain the desired concentration of pulverized solid fuel continuously transported by air from the feeders through pipelines to steam generator burners; in chemistry, for rapidly determining the concentration of pulverized materials transported by gas through pipelines to chemical reactors; and generally, the invention can be used in all situations in which a rapid measurement of pulverized material concentration is required.

PRIOR ART

Known are devices for measuring the concentration of suspended particles when they are transported pneumatically by means of a carrier fluid in a pipeline provided with an element for introduction of the suspended particles, with a parametric converter of the parameter characterizing the mass flow rate of the fluid carrier located inside the pipeline, and a parametric converter of the parameter characterizing the mass flow rate of the particles transported in suspension located on the measuring portion of the pipeline, the magnitude of the signals from these parametric converters being used to judge on the concentration of the suspended particles.

The disadvantages of these devices are related to the necessity to install the parametric converters which are of throttle type, as a rule, directly in the flow which results in a rapid wear of these parametric converters and in clogging the apertures of the pressure bleeding, thus reducing considerably the accuracy and reliability of measuring and rendering such devices unsuitable for stationary industrial measurements.

The known mentioned devices employ parametric converters, for measuring small pressure differentials which serve as parametric converters of the parameters characterizing the mass flow rate of the carrier fluid and of the particles transported in suspension which also impares the sensitivity of the devices since there are no such parametric converters ensuring reliable measurements under industrial conditions.

OBJECTS AND SUMMARY OF THE INVENTION

The object of the present invention is to provide a device for measuring the concentration of suspended particles which ensure a high sensitivity, accuracy and reliability of measurements under industrial conditions.

The object is accomplished in that the device for measuring the concentration of suspended particles when they are transported pneumatically by means of a carrier fluid in the pipeline provided with an element for introduction of the suspended particles, with a parametric converter of the parameter characterizing the mass flow rate of the carrier fluid located inside the pipeline, and a parametric converter of the parameter characterizing the mass flow rate of the particles transported in suspension located on the measuring portion of the pipeline, with the magnitude of the signals from the parametric converters being used to determine the concentration of the suspended particles, according to the invention comprises an additional pipeline located relatively to the principal pipeline so that one of its ends being the outlet end with respect to the direction of flow of the carrier fluid is disposed in the region of velocity stabilization of the suspended particles on the measuring portion confined by this region and the element for introduction of the particles, and the other end being located outside the measuring portion in the region free of particles transported in suspension, with the parametric converter of the parameter characterizing the mass flow rate of the particles transported in suspension being located in the additional pipeline.

The present device makes it possible to obtain a high sensitivity, accuracy and reliability of measurements under industrial conditions and to reduce pressure losses in the pipelines.

Specific embodiments of the present invention will now be described with reference to the accompanying drawings, in which:

DETAILED DESCRIPTION OF THE EMBODIMENTS

Figure 1:
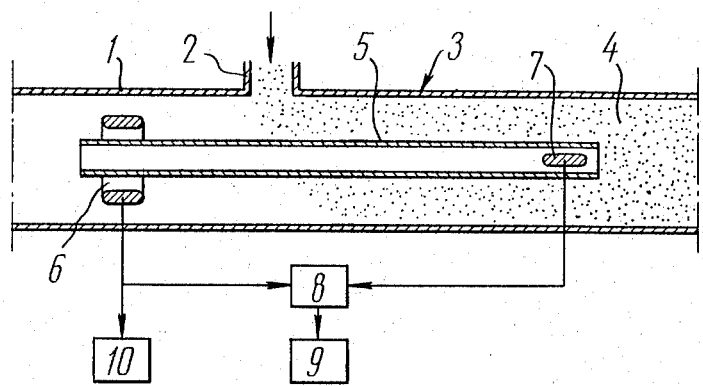
FIG. 1 is a view in longitudinal section of the first embodiment of the invention for measuring the concentration of suspended particles, with an additional pipeline located inside the principal pipeline.

The present device for measuring the concentration of suspended particles according to the invention comprises principal pipeline 1 (FIG. 1) in which the suspended particles, in the present embodiment, coal dust, are transported pneumatically by means of a carrier fluid, i.e., air. The pipeline 1 is provided with an element 2 for the introduction of particles transported in suspension which confines a measuring portion 3 of the pipeline 1 on one side with the other side of the portion being confined by a region 4 of velocity stabilization of these particles.

Installed on the measuring portion 3 inside the pipeline 1 there is an additional straight pipeline 5 whose end, being the outlet end with respect to the direction of flow of the carrier fluid and indicated by an arrow in the drawing, is located in the region 4 of velocity stabilization of the particles, and the other end is located outside the measuring portion 3 in a region free of particles transported in suspension.

Parametric converters 6 and 7 of the parameters characterizing the mass flow rate of the carrier fluid and the particles transported in suspension are located respectively in the principal pipeline 1 and the additional pipeline 5 in the areas free of suspended particles where velocity fields are quite uniform. The parametric converters 6 and 7 are the parametric converters of the thermal boundary layer which operate on the principle of the temperature changes of the body warmed by a heat source of permanent capacity with changes of the specific mass flow embracing the body. The outputs of the parametric converters 6 and 7 are connected to a unit 8 of comparison employing a familiar circuit on semiconductor elements and producing the ratio of the signals of parametric converters 6 and 7 proportional to the concentration of suspended particles.

The output of the unit 8 of comparison is connected to the input of a recorder 9 of particle concentration which is a millivoltmeter calibrated in concentration units. The mass flow rate of the carrier fluid is determined by a recorder 10 connected to the output of the parametric conveyer 6 which is a millivoltmeter calibrated in units of mass flow rate of the carrier fluid.

Figure 2:
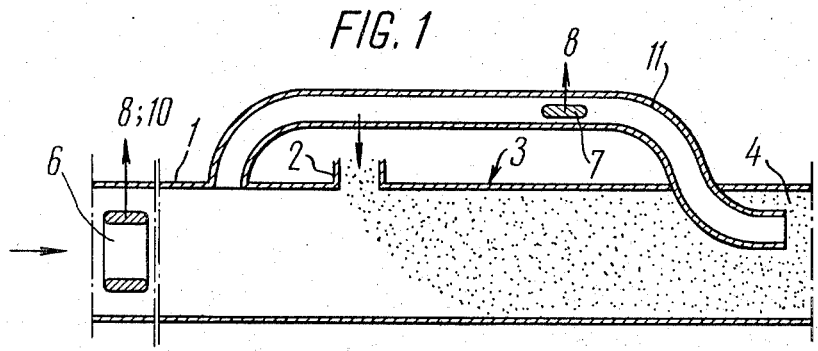
FIG. 2 is a view similar to FIG. 1 of the second embodiment of the device for measuring the concentration of suspended particles, with an additional pipeline located outside the principal pipeline.
Figure 3:
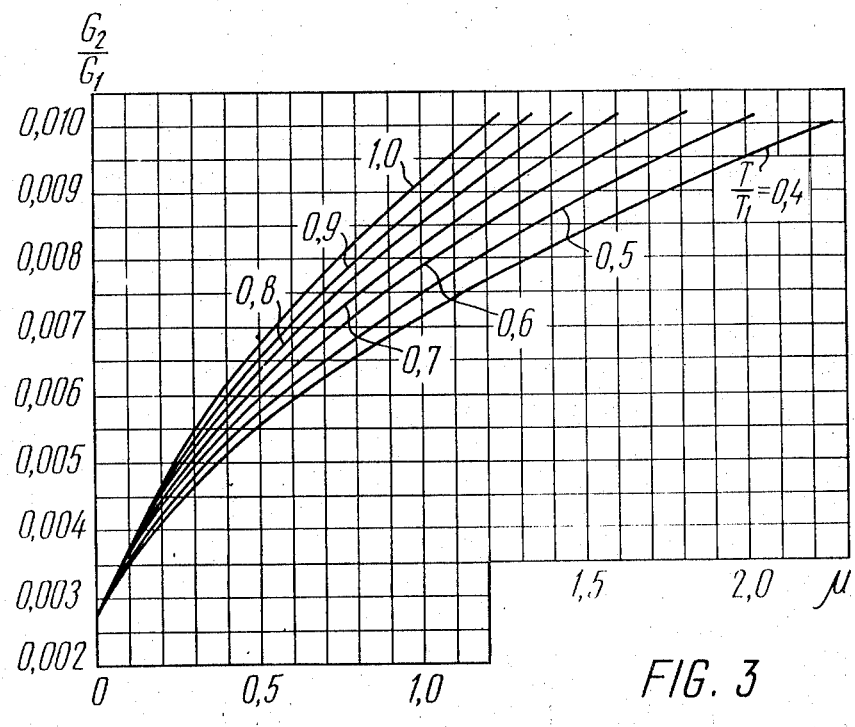
FIG. 3 is a diagram of performance characteristics of the present device with an additional pipeline located outside the principal pipeline with different temperature ratios of the carrier fluid and the particles transported in suspension.

In a number of cases it is more convenient to arrange a pipeline 11 (FIG. 2) outside the principal pipeline 1.

Feasible are embodiments of the device for measuring the concentration of suspended particles in which parametric converters of alternating pressure differential, thermoanemometers, turbogauges are used as parametric converters characterizing the mass flow rate of the carrier fluid and the particles transported in suspension.

When it is impossible to install the parametric converter characterizing the mass flow rate of the carrier fluid in the principal pipeline before the element for introduction of suspended particles since this portion of the principal pipeline is too short, it is possible to mount the parametric converter on the section which contains the suspended particles. In doing so, it is expedient to make use, as has been mentioned above, of the parametric converter of thermal boundary layer which has low sensitivity to the presence of suspended particles until their concentration reaches a definite value.

The principle of operation of the device for measuring the concentration of suspended particles is based on the relationship between the pressure differential $\Delta H$ on the measuring portion 3 of the pipeline 1 where the particles to be transported are accelerated and introduced through the element 2, and the number of these particles GW passing through a unit of cross-sectional area F of the pipeline 1:

$$\Delta H \approx GW/F \tag{1}$$

where $G$ = consumption of particles to be transported;

$W$ = velocity of particles.

The pressure differential at the ends of the additional pipeline 5, 11 entails the movement of pure carrier fluid therein. In this case, the braking pressure at the entrance to the additional pipeline 5, 11 may be considered equal to the braking pressure in the same section of the principal pipeline 1. In fact, the static pressures in the pipelines 1 and 5, 11 are also equal in the section passing through the outlet end of the additional pipeline 5, 11. Therefore, for the case when on the measuring portion 3 the friction losses are negligibly small as compared to the mass flow rate of energy of the carrier fluid for the acceleration of particles, the mass flow rate of the carrier fluid through the additional pipeline 5, 11 is much smaller than the mass flow rate through the principal pipeline 1, with the velocity component of the particles introduced into the flow through the element 2 is longitudinal with respect to the axis of the pipeline 1 and is small as compared to the velocity of the particles transported in the region 4 of velocity stabilization of these particles, and the stabilized velocity of the particles is close to the velocity of carrier fluid, we can write down:

$$\rho 1 \cdot W_1^2/2 + \rho 1 \cdot W_f^2 \cdot \mu \; (\rho 2 \cdot W_2^2/2) \; (\xi + 1) \tag{2}$$

where $\rho 1 \cdot W_1^2/2$ and $\rho 2 \cdot W_2^2/2$ = velocity pressures respectively in the pipelines 1 and 5, 11;

$\mu$ = mass;

$\xi$ = resistance coefficient of the pipelines 5, 11.

From the expression (2) we obtain:

$$\mu = F^2/2F_2^2 \cdot T_2 \cdot G_2^2/T_1 \cdot G_1^2 \; (\xi + 1) - 1/2 \tag{3}$$

where $G_1$ and $G_2$ = mass flow rates of the carrier fluid through the pipelines 1 and 5, 11;

$T_1$ and $T_2$ = temperatures of flows in the pipelines 1 and 5, 11;

$F_1$ and $F_2$ = cross-sectional areas of the pipelines 1 and 5, 11.

From Equations (2) and (3) it follows that it is possible to measure the concentration of suspended particles in the pipeline 1 by an indirect method using the present device by measuring the parameters characterizing the mass flow rate of the carrier fluid the pipelines 1 and 5, 11. Such parameters may involve velocity pressures, velocities, flow rates or pressure differentials.

If the above-mentioned conditions are not observed, Equation (3) becomes more complex which, however, does not result in deteriorating the characteristics of the device.

This point is illustrated by performance characteristics of the device with an additional pipeline 11 for measuring the concentration of coal dust supplied to the burners of the steam generator of the electric power station with different ratios of temperatures $T$ and $T_1$ of the transported particles and the carrier fluid.

The functional composition of coal dust on the 200 micron mesh size is 4–10 percent; dust temperature is about 100°C, and the carrier fluid (air) at 100°–400°C. The air temperature is fairly constant for the particular design of steam generator, but is likely to vary for some other design of steam generator. The abscissa of concentration $\mu$ (kg/kg) and the ordinate of the ratios of mass flow rates $G_2/G_1$ of carrier fluid in the pipelines 5, 11 and 1 are shown in the diagram.

The diagram reveals that the sensitivity of the device in the concentration range $0 < \mu < 2$ is rather high, increasing with the reduction of concentration and decreasing with its increase.

In those cases when it is necessary, the sensitivity can be increased by making the measuring portion of the pipeline 1 with a smaller cross-sectional area as compared with the remaining portion of the pipeline 1. This results in increasing the velocity of acceleration of the particles to be transported, increasing the pressure differentials at the ends of the additional pipeline 5, 11 and, consequently, increasing the mass flow rate of the carrier fluid in the pipeline 1.

In a number of cases it is expedient to construct the present device with a measuring portion having an expanding angle of taper to be determined from the equilibrium condition of static pressures on its boundaries while the particles to be transported are not there. Then, if use is made in the device of the additional pipeline 11 with a zero concentration of particles, the signal from the parametric converter 7 will be equal to zero.

The proposed device can also be used in pneumatic transport systems operating under vacuum with no dosimeter of transported particles, for example, while unloading powder and pelletized materials. In this case, the inlet end of the additional pipeline 5 is located outside the pipeline 1 in the region free of transported particles.

In all cases when the device operates, the outlet end of the additional pipeline 5, 11 is constantly blown through by the carrier fluid which reliably protects it from being clogged with the transported particles. If the length of the measuring portion 3 of the pipeline 1 is sufficient for a full acceleration of suspended particles, the result of measurements does not depend on the fractional composition of the particles.

The operating principle of the invention ensures that the output signal thereof is independent of the physical, chemical and mechanical properties of the suspended particles being transported.

The principal advantages of the proposed device for measuring the concentration of suspended particles lie in the possibility of installing the parametric converter of the parameters characterizing the mass flow rate of the carrier fluid and of the suspended particles transported in the regions where there are no suspended particles which makes it possible to use any known parametric converters for measurement purposes, e.g., mass flow rate meters of alternating pressure differential, thermoanemometers, mass flow rate meters employing the principle of the thermal boundary layer and others which are characterised by a high sensitivity, accuracy and reliability.

The device is characterized by a simple design, inexpensive to produce, convenient when used for a long period and does not require highly skilled maintenance personnel. At the same time, the losses of pressure caused by the device when installed in the pipelines are small.

What is claimed is:

1. A device for measuring the concentration of suspended particles comprising a first pipeline in which suspended particles are transported by means of a carrier fluid; an element for introduction of suspended particles, located in said pipeline; a measuring portion of said pipeline confined by said element for introduction of suspended particles and by a region of velocity stabilization of these particles; a second pipeline located relatively to said first pipeline so that one of its ends, being the outlet end with respect to the direction of flow of the carrier fluid is disposed in the region of velocity stabilization of suspended particles on said measuring portion, and the other end is located outside said measuring portion in a region free of particles transported in suspension; a parametric converter of the parameter characterizing the mass flow rate of the carrier fluid located in said first pipeline; a parametric converter of the parameter characterizing the mass flow rate of particles transported in suspension, located in said second pipeline, whose magnitude of the signal together with the signal from the above-mentioned parametric converter of the parameter characterizing the mass flow rate of the carrier fluid are used to determine the concentration of suspended particles.

2. The measuring device as claimed in claim 1, in which said second pipeline is located within the first pipeline.

3. The measuring device as claimed in claim 1 in which said second pipeline between said other end and the outlet end is located outside the first pipeline.

* * * * *